Sept. 1, 1942. O. E. STAPLES Re. 22,173

METHOD OF HOBBING GEARS

Original Filed Feb. 24, 1937 3 Sheets-Sheet 1

INVENTOR.
Otis E. Staples.
Kuris Hudson & Kent
ATTORNEYS

Sept. 1, 1942. O. E. STAPLES Re. 22,173

METHOD OF HOBBING GEARS

Original Filed Feb. 24, 1937 3 Sheets-Sheet 2

INVENTOR.
Otis E. Staples.
BY Kuris Hudson & Kent
ATTORNEYS

Sept. 1, 1942. O. E. STAPLES Re. 22,173

METHOD OF HOBBING GEARS

Original Filed Feb. 24, 1937 3 Sheets-Sheet 3

INVENTOR.
Otis E. Staples.
BY
Kuris Hudson & Kent
ATTORNEYS

Reissued Sept. 1, 1942 Re. 22,173

UNITED STATES PATENT OFFICE 22,173

METHOD OF HOBBING GEARS

Otis E. Staples, Euclid, Ohio, assignor to The Cleveland Hobbing Machine Company, Cleveland, Ohio, a corporation of Ohio Original No. 2,211,611, dated August 13, 1940, Serial No. 127,432, February 24, 1937. Application for reissue September 18, 1941, Serial No. 411,376

2 Claims. (Cl. 90—4)

The present invention relates to gear cutting and more particularly to a method or hobbing gears, splines, and the like.

An object of the present invention is the provision of a novel and improved method of hobbing gears, etc., which will produce articles of greater accuracy in less time than has heretofore been possible.

Another object of the present invention is the provision of a novel and improved method of hobbing wherein the hob is so rotated and translated relative to the work blank that the teeth cut from the periphery of the blank toward the center thereof.

The present invention resides in producing certain relative movements between the cutter and the work blank, and in certain details of construction and combinations and arrangements of parts, and further objects and advantages thereof will be apparent to those skilled in the art to which it relates from the following description of the method and the preferred embodiment of a machine for carrying out the method, described with reference to the accompanying drawings forming a part of this specification, in which similar reference characters designate corresponding parts throughout the several views, and in which Fig. 1 is a perspective view of a hobbing machine embodying the present invention;

Figure 1:
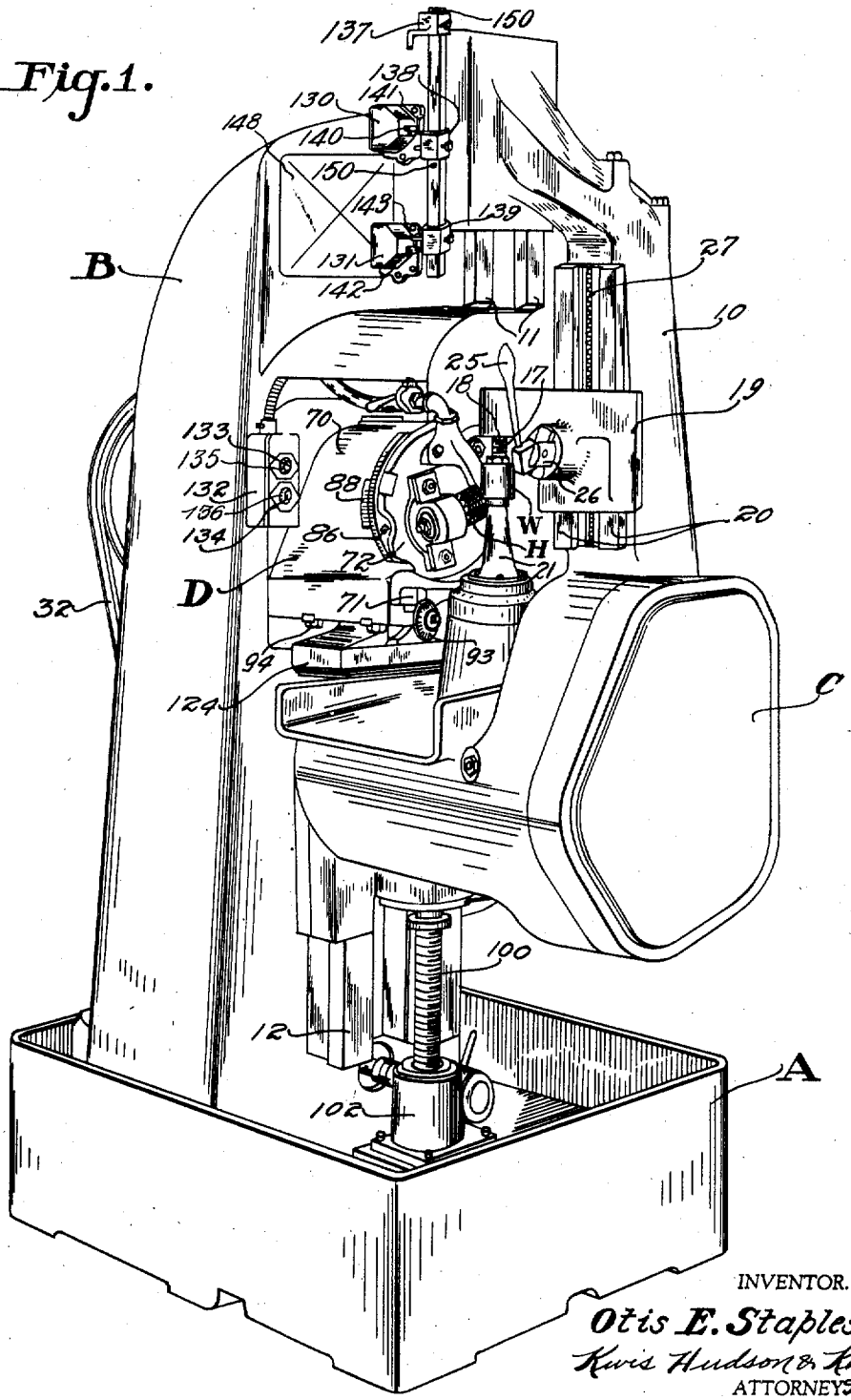

According to the provisions of the present method a work blank is moved vertically while a hob is rotated in cutting relation thereto and in such a manner that the cutting thrust produced by the hob is in the direction of the feed movement imparted to the work. In other words, the hob is rotated in such a manner that the teeth thereof cut from the outside of the blank towards the center thereof, while the work is moved axially and parallel to or substantially parallel to the gravitation of force acting thereon or on the work head which carries the work. The preferred machine for practicing the method of the present invention will now be described although it is to be understood that the invention can be applied to machines of different construction.

The machine illustrated is of generally vertical construction, and the bed thereof, designated in general by the reference character A, which also serves as a sump for the cutting fluid, etc., is made rectangular, permitting a number of machines to be readily ganged close together, synchronized and taken care of by a single operator. The frame of the machine, designated in general by the reference character B, is of heavy channel construction, providing maximum rigidity with minimum weight, and is bolted or otherwise securely fixed to the bed A.

Figure 3:
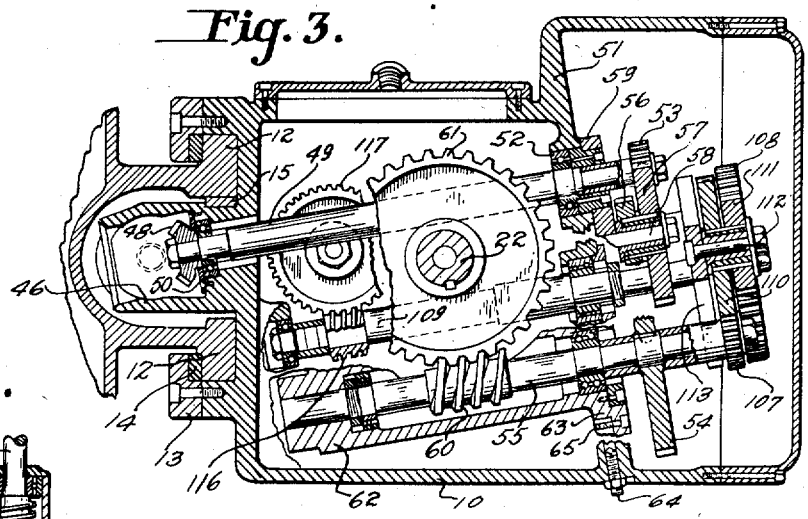
Fig. 3 is a section on the line 3—3 of Fig. 2.
Figure 4:
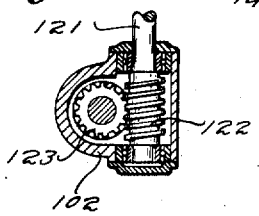
Fig. 4 is a section on the line 4—4 of Fig. 2.

The work head, designated in general by the reference character C, comprises a frame 10, slidably supported on vertically spaced ways 11 and 12 formed on the frame B at the top and bottom thereof, respectively. The work head is held in engagement with the lower ways 12 by members 13, see Fig. 3, bolted to the rear side of the work head frame 10 and projecting to the rear of the overhanging portions on the ways 12. Adjustable tapered gibs 14 interposed between the members 13 and the ways 12 are provided for the purpose of taking up the wear, etc. An adjustable gib 15 interposed between a rib on the rear of the work head frame and the right hand way prevents any side movement of the work head relative to the ways 12. The upper part of the work head C is maintained in engagement with the ways 11 in a manner similar to that in which the lower part of the work head is maintained in engagement with the lower ways 12. This construction provides a rigid support for the work, free from vibration, chatter, etc.

The work blank designated in general by the reference character W, is non-rotatably secured in any convenient manner, to a work arbor 17 supported between a tail center 18 carried by a tail stock 19 slidably supported on the ways 20 formed integral with the work head frame 10, and a chuck 21 fixed to the upper end of a work spindle 22 rotatably supported in the work head by anti-friction bearings 23. The tail stock 19 is adapted to be moved along the ways 20 by an operating handle 25 pivotally connected to the outer end of a member 26 rotatably supported in the tail stock and provided at its inner end with a gear, not shown, continually in mesh with a rack 27 secured to the work head frame 10. The lever 25 is rotatable about an axis parallel with the ways 20 to clamp and unclamp the tail stock 19, and about an axis normal thereto to move the tail stock along the ways. The work blank W may be non-rotatably secured to this work arbor 17 in any convenient manner.

The work spindle 22 is driven from an electric motor 30 supported on an adjustable platform in a recess in the frame B and connected to the main drive shaft 31 of the machine by a fleible drive connection designated in general by the reference character 32. The rear end of the main drive shaft 31 is rotatably supported in a boss 33 formed integral with the frame B, and the front end thereof is supported in a member 35 fixed to the frame B, through the medium of a bevel gear 36 splined thereto, the hub of which gear is rotatably supported in an aperture 37 in the member 35 by anti-friction bearings 38.

The bevel gear 36 previously referred to is continuously in mesh with a bevel gear 40 fixed to the upper end of a vertically positioned spline shaft 41 the upper end of which is rotatably supported in the member 35. The lower end of the spline shaft 41 extends into an oil recess 43 in the work head C and has a splined connection with a bevel gear 44 provided with an elongated hub rotatably supported in a rearwardly extending portion 46 of the work head frame. The bevel gear 44 is continuously in mesh with a bevel gear 48 fixed to the rear end of a horizontal shaft 49, the rear end of which shaft is rotatably supported in the work head frame by anti-friction bearings 50. The front end of the shaft 49 is rotatably supported in a partition 51 in the work head frame by anti-friction bearings 52, and carries a gear 53 fixed thereto. The gear 53 is operatively connected to a gear 54 fixed to a horizontal shaft 55 through change gears 56 and 57 in mesh with gears 53 and 54, respectively. The change gears 56 and 57 rotate in unison and are rotatably supported on a sleeve surrounding a bolt 58, which bolt is adjustably supported in a T-slot in a bracket 59. The bracket 59 is rotatably supported coaxial with the shaft 49, and is adapted to be secured in any adjusted position by suitable means not shown. The shaft 55 is operatively connected to the work spindle 22 through a worm and worm wheel 60 and 61, respectively, the former of which is fixed to the shaft 55 and the latter to the spindle 22.

In order to provide means for taking up wear and lost motion between the worm 60 and worm wheel 61 the shaft 55 is rotatably supported in a sleeve member 62 which, in turn, is rotatably supported in the frame of the work head eccentric with reference to the axis of the shaft 55. The reduced rear end of the member 62 is rotatably supported in a recess in the work head frame, and the front end thereof is provided with a flange 63 rotatably supported in the partition 51. The member 62 is rotated so as to move the worm 60 into or toward the worm wheel 61 by a member 64 threaded into an aperture in the partition 51, and provided with a reduced end portion which abuts a flat surface on the flange 63. Cap screws 65 projecting through arcuate slots in the flange 63 and having threaded engagement with the partition 51 provide means for securing the sleeve member 62 in any adjusted position.

Figure 2:
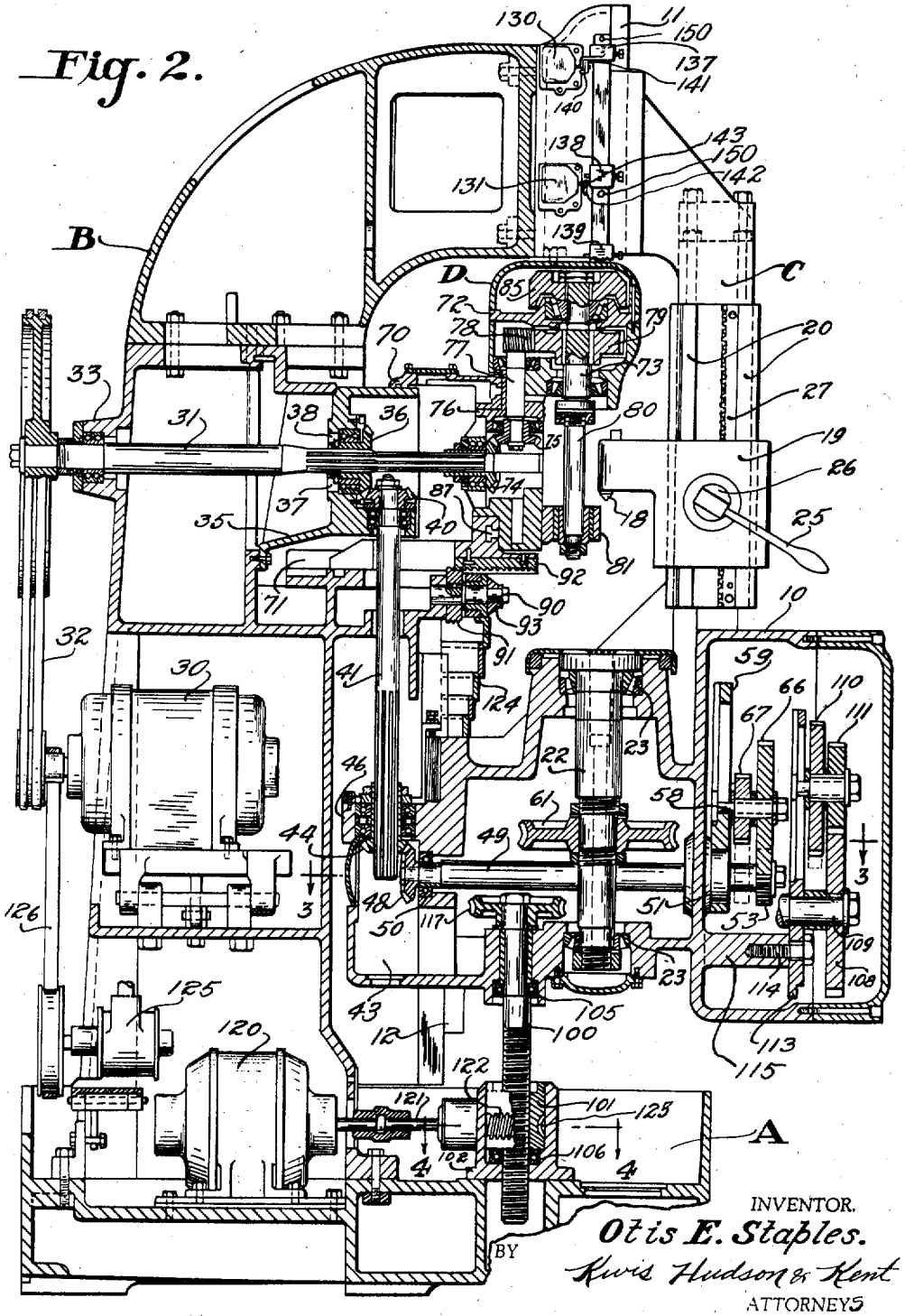
Fig. 2 is a vertical section through the machine shown in Fig. 1 on the center line thereof, with the work head dropped to its lower position, the hob head rotated to a vertical position, and the hob and work arbor omitted.

The tool head, designated in general by the reference character D, comprises a member 70 slidably supported on horizontal ways 71 formed integral with the frame B intermediate the vertically spaced ways 11 and 12 and a member 72 rotatably supported by the member 70 coaxial with the main drive shaft 31. A tool spindle 73 which is rotatably supported in the member 72 by suitable anti-friction bearings is driven from the main drive shaft 31 through miter gears 74 and 75, the former of which is provided with an elongated hub splined to the front end of the main drive shaft 31 and rotatably supported in a rearwardly extending boss 76 formed integral with the member 72. Miter gear 75 is fixed to the lower end of a stud shaft 77 rotatably supported in the member 72, the upper end of which carries a spiral pinion 78 in mesh with a spiral gear 79 fixed to the tool spindle 73. The hub designated generally by the reference character H is carried by a hob arbor 80 fixed at its upper end, as viewed in Fig. 2, to the tool spindle 73. The lower end of the hob arbor 80 is rotatably supported in a bracket 81 bolted to the member 72. The upper end of the tool spindle is provided with a flywheel 85 fixed thereto. The member 72 is rotatably supported by the member 70 by the engagement of the boss 76 in a cylindrical aperture in the front wall of the member 70. Bolts 86, the heads of which engage in a circular T-slot 87 are provided for securing the member 72 in any adjusted angular position. The construction just described permits the axis of the hob to be adjusted about the axis of the main drive shaft 31, and a vernier scale 88 permits the hob to be accurately and quickly set at any desired angle.

Movement of the tool head D along the ways 71 to move the hob toward or from the work is effected upon the rotation of a shaft 90 rotatably supported in the frame B and provided with a worm 91 fixed thereto which worm is continuously in mesh with a rack 92 secured to the underside of the member 70. The shaft 90 is provided with a square end to facilitate turning the same and a graduated dial 93 to facilitate setting of the hob. The tool head is adapted to be clamped to the way 71 in any adjusted position by bolts 94, if desired. The member 70 has a telescopic connection with the boss-like member 35, which prevents the entrance of chips, etc., into the interior of the tool head, while permitting movement thereof along the ways 71.

In the machine shown the downward movement of the work head C which movement carries the work blank past the tool, is effected by the weight of the work head but is controlled through the medium of a lead screw 100 rotatably supported in the work head B, and having threaded engagement with a nut 101 rotatably supported in a bracket 102 bolted or otherwise secured to the base A. Linear movement of the screw 100 and the nut 101 relative to the work head frame 10 and the bracket 102, respectively, is prevented by anti-friction thrust bearings 105 and 106 interposed between the lead screw 100 and the work head frame 10 and the nut 101 and the bracket 102, respectively. The lead screw 100 is driven in predetermined timed relation to the rotation of the work and tool spindle, to lower the work head B at the desired feed rate, from a gear 107 fixed to the extreme outer end of the shaft 55, which gear is operatively connected to a gear 108 fixed to the front end of a horizontal shaft 109 through the medium of change gears 110 and 111 in mesh with the gears 107 and 108, respectively. The change gears 110 and 111 are rotatably supported on a stud shaft 112 adjustably secured in an elongated slot in a bracket 113, rotatably supported coaxial with the shaft 109 and adapted to be secured in any adjusted position by means of a bolt 114 threaded onto a projection 115 formed on the partition 51. The bolt 114 projects through an arcuate slot in the bracket 113. The shaft 109 which is rotatably supported in the frame 10 and the partition 51 by anti-friction bearings has a worm 116 fixed thereto, in mesh with a worm wheel 117 fixed to the upper end of the lead screw 100.

A rapid traverse movement is imparted to the work head C to quickly bring the work down to the cutter, or to quickly return the work head to its starting position, by a reversible motor 120 supported on the bed A within the frame B, and operatively connected to the nut 101, through the medium of a shaft 121, rotatably supported in suitable bearings in the bracket 102, and connected to the armature shaft of the motor 120 by a suitable coupling. The shaft 121 has keyed thereto a worm 122 in mesh with a worm wheel 123 formed about the circumference of the nut 101. The worm 122 and worm wheel 123 are of the self-locking type which prevents rotation of the nut 101 with reference to the lead screw 100 while the motor 120 is at rest during the feeding movement of the work head.

The work head frame 10 is divided into two compartments by the partition 51, both of which compartments are adapted to be filled with oil to a suitable level for the lubrication of the various parts housed within the compartments. All the gears, etc., in the work head are enclosed within the same, which prevents the entrance of chips and dirt, etc., thereinto. A telescopic guard 124 prevents the accumulation of chips, etc., on the ways 12. Cutting fluid is supplied to the tool by a pump 125 driven from the motor 30 through a flexible drive connection 126. Since the motor 30 is energized only during the cutting operation the cutting fluid is supplied merely as needed. The pump 125, like the motor 30, is supported on an adjustable base in a recess in the frame B.

The motors 30 and 120 preferably are three phase alternating current motors and the motor 120 is reversible. The operation of the motors is under the control of upper and lower limit switches 130 and 131, respectively, and a start-stop push button switch 132, both the start and stop buttons 133 and 134, respectively, of which are provided with ferrules adapted to limit the movement thereof. Both the limit switches and the start-stop push button switch are well known in the art and per se do not form a part of the present invention and may be of any conventional construction. The start button 133 is normally in the out position, i. e., the position shown in the wiring diagram, but may be set in the neutral position by the ferrule 135 associated therewith, and the stop button 134, which is normally closed, may be set in the open position by the ferrule 136 associated with it. The limit switches 130 and 131 are operated and controlled by adjustable stops 137, 138 and 139, carried by the work head C. The stops 137 and 138 engage the arms 140 and 141 of a bell crank lever on the limit switch 130 to actuate said switch, and the stop 139 engages the arms 142 and 143 of a bell crank lever on the limit switch 131 to actuate the same.

The motor 30 is connected to and from the supply lines $L_1$, $L_2$, $L_3$ through the medium of a solenoid operated circuit breaker panel 145; the operating solenoid and holding-in circuit of which are indicated at *c* and *c'*, respectively. The motor 120 is connected to and from the supply lines through the reversible circuit breaker panel 146, the operating solenoids and their respective holding-in circuits of which are designated as *u*, *u'* and *d*, *d'*. The reference character *u* designates the solenoid which closes the circuit to the motor 120 to operate the same in a direction to raise the work head C, and the solenoid which closes the circuit to motor 120 to lower the work head is designated by the reference character *d*. The leads to the motor 30 are designated $T_1$, $T_2$, $T_3$, and to the motor 120 as $T_1'$, $T_2'$, $T_3'$. The reference character 147 designates a contact relay. The panels 145 and 146 are enclosed in the head of the frame B behind the covers 148 on opposite sides of the frame.

Figure 5:
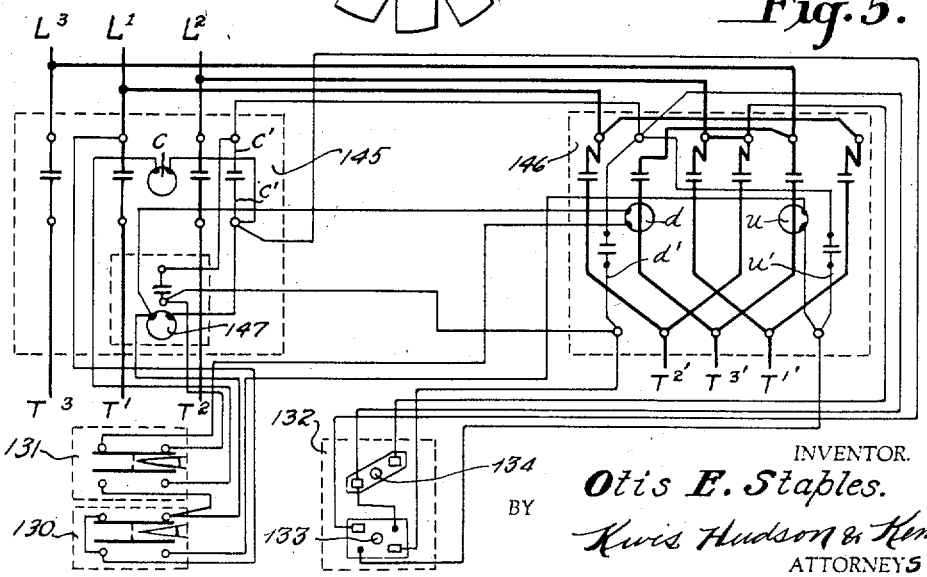
Fig. 5 is a wiring diagram of the electrical circuits of the machine.

The operation of the machine is as follows: With the machine at rest and a work head in the upper position, the electrical circuit is as shown in the wiring diagram. Assuming that a work blank has been secured in position between the work spindle chuck and the tail center, the start button 133 is pressed by the operator, closing the circuit to the contact relay 147 which, in turn, closes the circuit to the solenoid *d*, energizing the motor 120. The motor 120 in turn rotates the nut 101 at a high speed to quickly lower the work head under its own weight and bring the work down to the hob. Upon release of the start button 133 the circuit relay 147 is closed through the holding-in circuit *d'* which is now energized. Thereafter the relay 147 maintains its own circuit. The stop 139 is so positioned that it engages the upstanding arm 142 of the limit switch 131 and moves the contact arm to its lower position, see Fig. 5, just prior to the engagement of the work with the hob, opening the circuit to solenoid *d* and closing the circuit to solenoid *c*, through the contacts of relay 147, stopping the motor 120 and starting the motor 30. The holding-in circuit *c'* maintains the circuit to the motor 30 until the work has traveled down past the hob and the cutting operation has been completed, at which time the stop 137 engages the arm 140 and trips the limit switch 130, opening the circuit to the motor 30 and resetting the circuit to the solenoid *u* so that the motor 120 will be energized to quickly raise the work head C to its starting position when the start button 133 is again pressed.

The work head C remains at rest in the lower position until the finished blank has been removed, after which the start button 133 is pressed by the operator to raise the work head. As the work head C moves up, the stop 139 engages the arm 143 and returns the limit switch 131 to its initial or starting position without interrupting the circuit to the motor 120. As the work head C approaches its upper limit of movement, the stop 138 engages the lever 141, returning the limit switch 130 to its starting or initial position, and interrupting the circuit to the motor 120. After a new blank has been positioned on the work head, the cycle of operations is repeated. Stationary pins 150 fixed to the work head frame 10 limit the movement or adjustment of the stops 137 and 138 so that it is impossible for the work head C to be accidentally moved off of the way, etc. The machine may be stopped at any time during an operation by merely pressing the stop button 134, after which the machine can only be started by pressing the start button 133.

If desired, the stop button 134 can be set in an open position by turning the ferrule 136, in which event the machine will not start upon movement of the start button 133. This construction is particularly important when making repairs on the machine, etc. The start button 133 can likewise be set in a neutral position by turning the ferrule 135, in which event the work head C will stop at the end of its traverse down movement without automatically starting the motor 30. This operation is followed in setting up the machine and where the tool is making a second cut on a blank and it is desired to line up the same.

Figure 6:
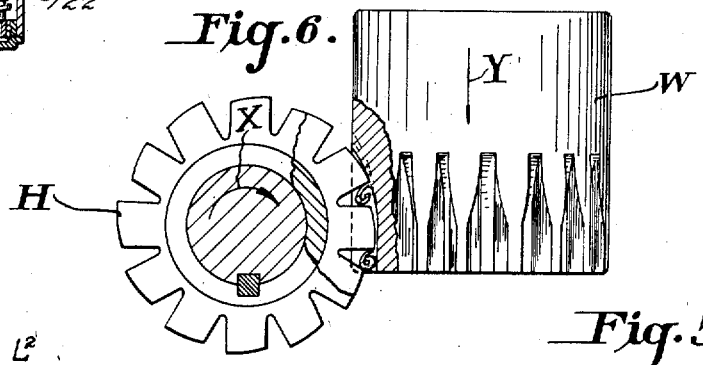
Fig. 6 is an enlarged view showing the hob and the work blank in operating engagement.

The direction of rotation of the motor 30 and the gearing, etc., is such that the rotation of the hob is as indicated by the arrow *x* in Fig. 6, while the vertical feed movement of the work is in the direction of the arrow *y*, that is axially of the work. In other words, the spindle moved to effect the feed is moved in the direction of its axis and in line with the action of gravity. From the foregoing it will be apparent that each tooth of the hob cuts from the outside of the blank towards the center thereof and that the heavy part of the cut occurs as the tooth of the hob enters the work. While the size of the chips shown in Fig. 6 has been exaggerated somewhat, they illustrate the shape thereof. I have found that the method of the present invention materially increases the efficiency of the cutting action, eliminates chip digs in the work, and in many ways contributes to greater accuracy. The production is increased and the life of the hobs lengthened in addition to obtaining better work.

In the preferred embodiment of the machine shown the thrust produced by the cutting operation is in a downwardly direction, but it is to be understood that the direction of feed, etc., may be reversed. In the machine shown the weight of the work head is adequate to prevent backlash when the feed is in an upwardly direction, but even so it is advantageous to operate it in the preferred manner, since when operated in this manner the chips fall clear of the work and tool more readily and the thrust produced by the cutting action is against the heavy headstock instead of against the relatively light tailstock.

From the foregoing description, it will be apparent that the objects of the present invention heretofore enumerated and others have been accomplished and that a novel and improved method of hobbing has been provided wherein the work blank is moved vertically in the direction of its axis and in line with the gravitation of force exerted thereon in cutting relation to the hob which is rotated in such a manner that the hob cuts from the outside of the blank towards the center.

Having thus described my invention, what I claim is:

1. The method of hobbing which comprises rotating a blank to be cut about a vertical axis while moving the same vertically in cutting relation past a hob rotated in timed relation to the rotation of the blank and in such a direction relative to the direction of feed that the hob cuts from the periphery of the blank towards the center with the vertical component of the cutting thrust produced thereby acting upon the work in the direction in which the blank is moving.

2. The method of hobbing which comprises rotating the blank to be cut about a vertical axis while moving the same in a downward direction in cutting relation past a hob rotated in timed relation to the rotation of the blank and in such a direction relative to the direction of feed that the hob cuts from the periphery of the blank towards the center with the vertical component of the cutting thrust produced thereby acting upon the work in a direction in which the blank is moved.

OTIS E. STAPLES.